United States Patent
Elliott

(10) Patent No.: US 9,849,782 B2
(45) Date of Patent: Dec. 26, 2017

(54) HYDRAULIC MOTOR HAVING CONTROLLED OUTPUT BASED ON MACHINE SLIPPAGE MODEL

(75) Inventor: Christopher Elliott, Apex, NC (US)

(73) Assignee: Caterpillar Inc., Peoria, IL (US)

( * ) Notice: Subject to any disclaimer, the term of this patent is extended or adjusted under 35 U.S.C. 154(b) by 1068 days.

(21) Appl. No.: 13/477,692

(22) Filed: May 22, 2012

(65) Prior Publication Data
US 2013/0313033 A1 Nov. 28, 2013

(51) Int. Cl.
*B60K 28/16* (2006.01)
*F16H 61/47* (2010.01)
*F16H 61/475* (2010.01)

(52) U.S. Cl.
CPC ............ *B60K 28/16* (2013.01); *F16H 61/47* (2013.01); *F16H 61/475* (2013.01); *B60W 2720/26* (2013.01); *B60Y 2200/25* (2013.01); *B60Y 2200/411* (2013.01)

(58) Field of Classification Search
CPC ....... B60K 28/16; B60T 8/1775; F16H 61/47; F16H 61/475; B60W 2720/26; B60Y 2200/25; B60Y 2200/411
USPC .......................................... 701/99; 180/197
See application file for complete search history.

(56) References Cited

U.S. PATENT DOCUMENTS

| 4,521,856 | A | 6/1985 | Phelps et al. |
| 5,471,388 | A | 11/1995 | Zomotor et al. |
| 5,534,764 | A | 7/1996 | Masaki et al. |
| 5,696,683 | A | 12/1997 | Schafer et al. |
| 6,151,546 | A | 11/2000 | Schmitt et al. |
| 6,801,862 | B2 | 10/2004 | Grob et al. |
| 7,715,968 | B2 | 5/2010 | Mori |
| 2005/0145415 | A1* | 7/2005 | Doering et al. ................. 175/24 |

OTHER PUBLICATIONS

"The Force of Friction", 1998 at Science Joy Wagon.*
Charles E.Grawey, frictionally Driven Belted Work Machine, Nov. 1, 2005, U.S. Pat. No. Re. 38,858E.*

* cited by examiner

*Primary Examiner* — Nga X Nguyen
(74) *Attorney, Agent, or Firm* — Leydig, Voit & Mayer, LTD

(57) ABSTRACT

A method of managing operation of a machine is described herein. The machine includes drive components that supply a propulsive force exerted by the machine on a traveled surface. The machine includes a programmed controller that controls power output by a motor to the drive components of the machine, in accordance with a slippage model, to actively manage excessive slippage at a physical interface between the machine and the traveled surface. The programmed controller determines a track force indicative of the propulsive force exerted by the machine on the traveled surface. The programmed controller further determines a modeled slippage based, at least in part, upon the track force and the slippage model. The machine conditionally causes a reduction of the power output by the motor based upon a comparison, by the programmed controller, between the modeled slippage and a slippage limit.

20 Claims, 4 Drawing Sheets

HYDRAULIC MOTOR HAVING CONTROLLED OUTPUT BASED ON MACHINE SLIPPAGE MODEL

TECHNICAL FIELD

This patent disclosure relates generally to controlling wheel/track slippage (e.g., slip percentage) by machines and, more particularly, to limiting power supplied to propulsive continuous tracks or wheels on machines, such as earth moving machines having hydraulic drive mechanisms that utilize liquid fluid pressure to generate a propulsive force for moving the machinery along a surface. Such control, where slipping is accepted to a degree, is distinguished from the more general concept of traction control that includes arrangements for maximizing the amount of lateral driving/breaking force exerted by a machine upon a traveled surface.

BACKGROUND

Earth moving machinery, both wheel and track-driven, operate on a variety of surface types and grades. Moreover, such machinery is subject to an acceptable level of slipping while attempting to dig into or move material. Continuous track machines are a class of earth moving machinery (e.g., bulldozers, earth movers, etc.) where the machine propulsion/ground interface is a continuous band of joined metal plates. The continuous band of plates is driven by two or more wheels/sprockets. The large surface area of the tracks distributes the weight of the vehicle over a greater surface area than wheel-propelled machinery. The continuous track machines are thus generally able to traverse soft (e.g., muddy) ground more easily than wheeled machinery that would likely get stuck in relatively soft ground. Traction is enhanced on continuous track machinery by the presence of prominent metal ridges extending from the metal plates. The pronounced ridges/treads of the continuous track plates provide good traction in soft surfaces. Continuous track machines are commonly used on a variety of vehicles today, including bulldozers and excavators. However, continuous tracks can be found on any vehicle used in an application that can benefit from the added traction, low ground pressure and durability inherent in continuous track propulsion. Other earth moving machinery (e.g., a wheel loader) is equipped with large wheels with wide treads for providing extra traction in potentially soft ground.

Hydraulic machines are driven by fluid pressure. Examples of such machinery include wheel loaders, bulldozers and other continuous track driven machinery. In hydraulic machines, hydraulic fluid is transmitted to hydraulic motors and hydraulic cylinders, and the fluid becomes pressurized according to a resistance present in the motors/cylinders. The fluid is controlled directly or automatically by control valves and distributed throughout the machinery by hoses and tubes. A fundamental feature of hydraulic systems is the ability to apply a potentially very large force, through force multiplication, in a relatively easy way by appropriately sizing effective area of connected cylinders or effective displacement (volume per pump revolution) between a pump and a motor (sometimes referred to as transmission or displacement ratio). Given the potentially very large forces generated by hydraulically driven machinery, loss of traction is inevitable. When traction is lost between the physical drive interface between the machinery and the ground, power output and force are decreased to stop the slipping condition.

It is useful to determine when an excessively large amount of slippage occurs at a drive interface between a machine and a surface (e.g., the pavement, ground, etc.) upon which the machine travels. In wheel driven machines, known anti-slip mechanisms (during acceleration) compare drive wheel and driven wheel speeds to detect/measure actual slippage and reduce torque demand when excessive slippage is detected. See e.g., Phelps et al., U.S. Pat. No. 4,521,856 and Schafer et al, U.S. Pat. No. 5,696,683. Such comparisons are unavailable in the case of continuous track machines that have only drive tracks.

This and other shortcomings in the state of the art are addressed by aspects of an exemplary method and transmission assembly (including a controller thereof) described herein.

SUMMARY OF THE INVENTION

The disclosure describes, in one aspect, a method of managing operation of a machine including drive components that supply a propulsive force exerted by the machine on a traveled surface. The machine includes a programmed controller that manages excessive slippage at a physical interface between the machine and the traveled surface. The method of operating the machine includes determining a track force indicative of the propulsive force exerted by the machine on the traveled surface. The method further includes determining a modeled slippage based, at least in part, upon the track force and a slippage model. The machine conditionally causes a reduction of the power output to the drive components, by a motor, based upon a comparison between the modeled slippage and a slippage limit.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE DRAWINGS

Figure 1:
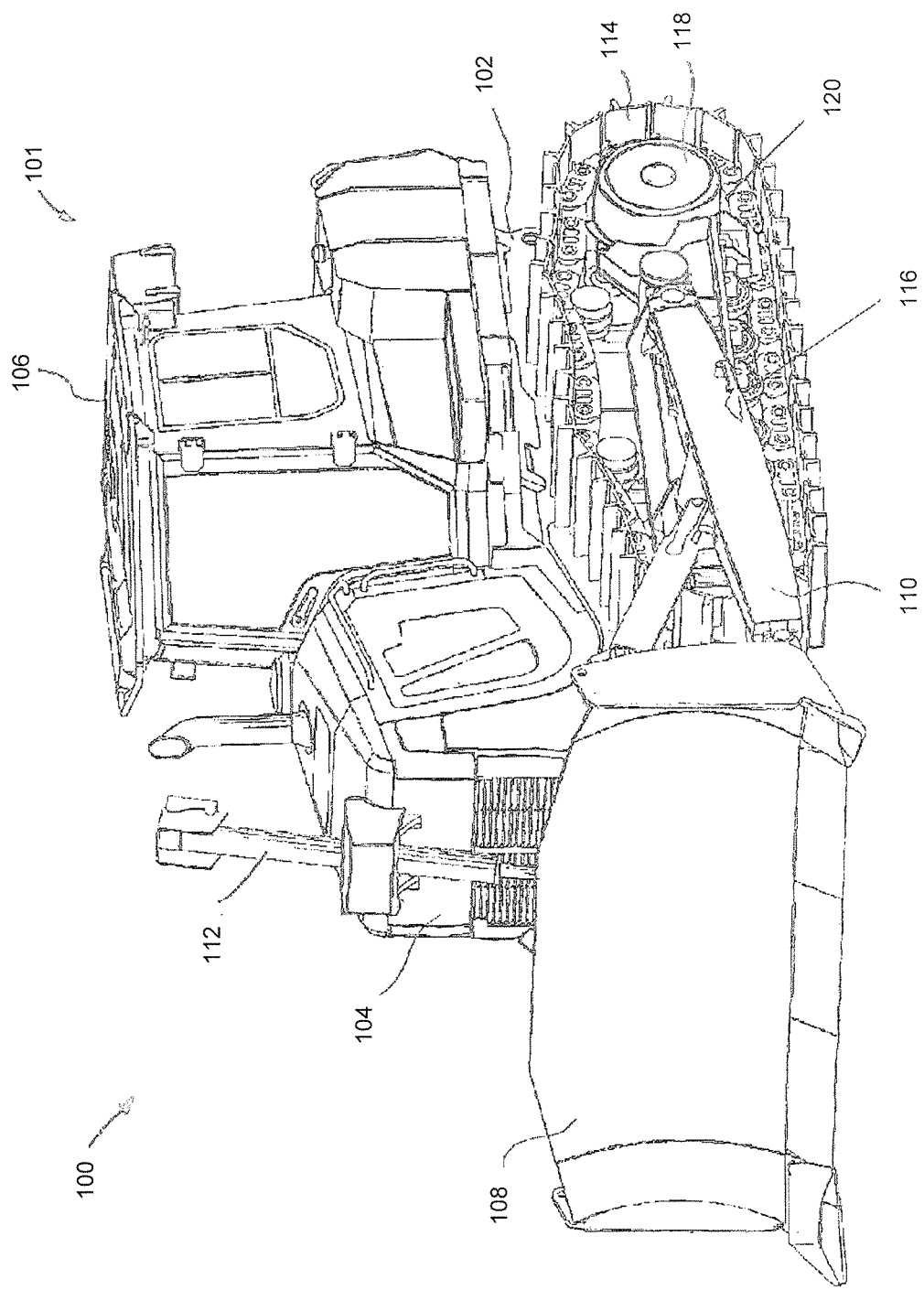
FIG. 1 is an outline perspective view of a continuous track-type machine, which is illustrated as one example of a machine in accordance with the disclosure.

Before turning to the drawings, it is generally noted that this disclosure relates to systems and methods that incorporate a programmed controller to facilitate managing (e.g., limiting to an acceptable range) slippage at a machine propel/track-to-ground interface in accordance with a slippage model. The slippage model relates slip percentage to a propulsive force exerted by the machine. The programmed controller manages slippage by limiting (reducing when necessary) power delivered by a hydraulic motor to drive components (e.g., continuous track sprockets) for the machine in accordance with slippage estimations rendered by the slippage model for a calculated estimation of current track force exerted by the motor drive components. Thus, power delivered by the hydraulic motor to drive components is controlled in association with a continuously updated slippage model to ensure slippage is maintained at/below an acceptable limit in potentially changing track-to-ground interface conditions.

Furthermore, with regard to maintaining the slippage model, the programmed controller maybe configured to continuously update the slippage model during operation of the machine to provide a dynamic slippage model reflecting current track-to-ground interface conditions. Updating the slippage model enables the programmed controller to modify the hydraulic motor power delivery response to observed slippage in accordance with a diverse set of potential conditions. Thus, a slippage model generated during operation of the machine during dry, hard soil conditions can be updated, for example, in a matter of minutes of operation during subsequent operation under wet, muddy conditions. Adapting the machine operation to changing traction conditions is potentially further aided by, for example, operator selectable pre-stored slippage models for particular generalized conditions such as hard surface, loose soil, sand, mud, etc. Such pre-stored slippage models may be thereafter tuned during subsequent operation of the machine. When updating the slippage model, currently calculated force ratio/slip percentage data points may be appropriately weighted (in relation points on a current slippage model curve) using any of a variety of known filtering and curve-fitting algorithms, and appropriate time constants. Adjustment of the time constants can be used to affect the responsiveness of the slippage model to current operating conditions.

Regarding maintaining the slippage model, the programmed controller may be configured to continuously update the slippage model based upon calculated track-to-normal force ratios (taking into account operation of the machine on a non-level surface) over a range of slip percentages of the drive (continuous track or wheel) with respect to a drive surface. See, FIG. 3. In an illustrative example, the programmed controller continuously generates/updates the slippage model based upon acquired/calculated estimate values for non-slipping velocity, actual velocity, normal force and track force. The programmed controller may be configured to render the velocity and force values from a set of operational parameter values provided by sensors typically found on hydraulically powered machines. For example, the programmed controller acquires sensor values for the following parameters: acceleration (in direction of machine motion), machine incline/slope (estimated or measured), motor speed (machine speed, proportional to motor RPM), hydraulic pressure (for hydraulically powered machine) across the motor input/output, motor(s) displacement command (delivered power) and gear ratio of final drive.

Regarding using the model to manage slippage, during operation of the machine, the programmed controller may be configured to limit, and reduce if necessary, power output of hydraulic motor, in view of a sensed/calculated current track-to-normal force ratio, in accordance with: (1) the slip percentage model, and (2) a specified slip percentage limit. The acceptable level of slip percentage is configurable to meet a variety of operating conditions. Thus, during operation of the machine, the programmed controller may be configured to apply a current track-to-normal force ratio to the slippage model to determine a current model-based slippage estimate for the machine. In response to a determination of excessive slippage, the programmed controller may be configured to reduce power delivered by the hydraulic motor to the track drive sprocket (in continuous track-driven machines). In a particular example, hydraulic motor power reduction is achieved by reducing a hydraulic motor continuously variable transmission (CVT) ratio. Reducing the CVT ratio by, for example, increasing the hydraulic motor displacement in relation to the hydraulic pump displacement has the effect of reducing the speed of the hydraulic motor. Reducing hydraulic motor speed tends to reduce slippage of the continuous track and increase the overall efficiency of machine operation. Reducing power output of the hydraulic motor can be achieved in any of a variety of ways, including reducing the power output of an engine driving a pump supplying pressurized fluid to the hydraulic motor.

Having briefly summarized the general functionality of an illustrative slippage model-based machine control scheme, attention is directed to FIG. 1 that provides an outline perspective view of one example of a machine 100 incorporating such control scheme. In the illustration of FIG. 1, the machine 100 is a continuous track tractor 101, which is used as one example for a machine to illustrate a slippage (traction) model generation and use arrangement. While the arrangement is illustrated in connection with the continuous track tractor 101, the arrangement described herein has potential applicability in various other types of machines, such as wheel propelled machines (e.g., wheel loaders) that operate upon unpaved surfaces where some slipping of drive wheels is acceptable during normal operation. The term "machine" refers to any machine that performs some type of operation associated with an industry such as mining, construction, farming, transportation, or any other industry known in the art. For example, the machine may be an earth-moving machine, such as an excavator. Other, non-track machines include a dump truck, backhoe, motor grader, material handler or the like.

In the illustrated embodiment, the machine 100 includes a frame 102 supporting an engine 104. In the illustrated embodiment, the engine 104 is an internal combustion engine providing power to various machine systems in the form of a torque output. Operation of the machine 100 is controlled, in part, by an operator. A blade 108 is connected via linkages 110 to the frame 102, and an actuator 112 interconnects the blade 108 to the frame 102 at a selectable position or height. The actuator 112 in the illustrated embodiment is a hydraulic cylinder.

The machine 100 includes ground engaging members, which are illustrated as two continuous tracks 114 (only one being visible) as one example, but other types may be used. In the illustrated embodiment, the two continuous tracks 114 are associated with a series of idle rollers 116 and are driven by two hydraulic motors (not shown) connected to final drives (sprockets) 118 (only one visible). In an alternative embodiment, electric motors are provided in place of the hydraulic motors. In both the electric and hydraulic motor arrangements, the motors are powered by the rotational output of the engine 104.

Figure 2:
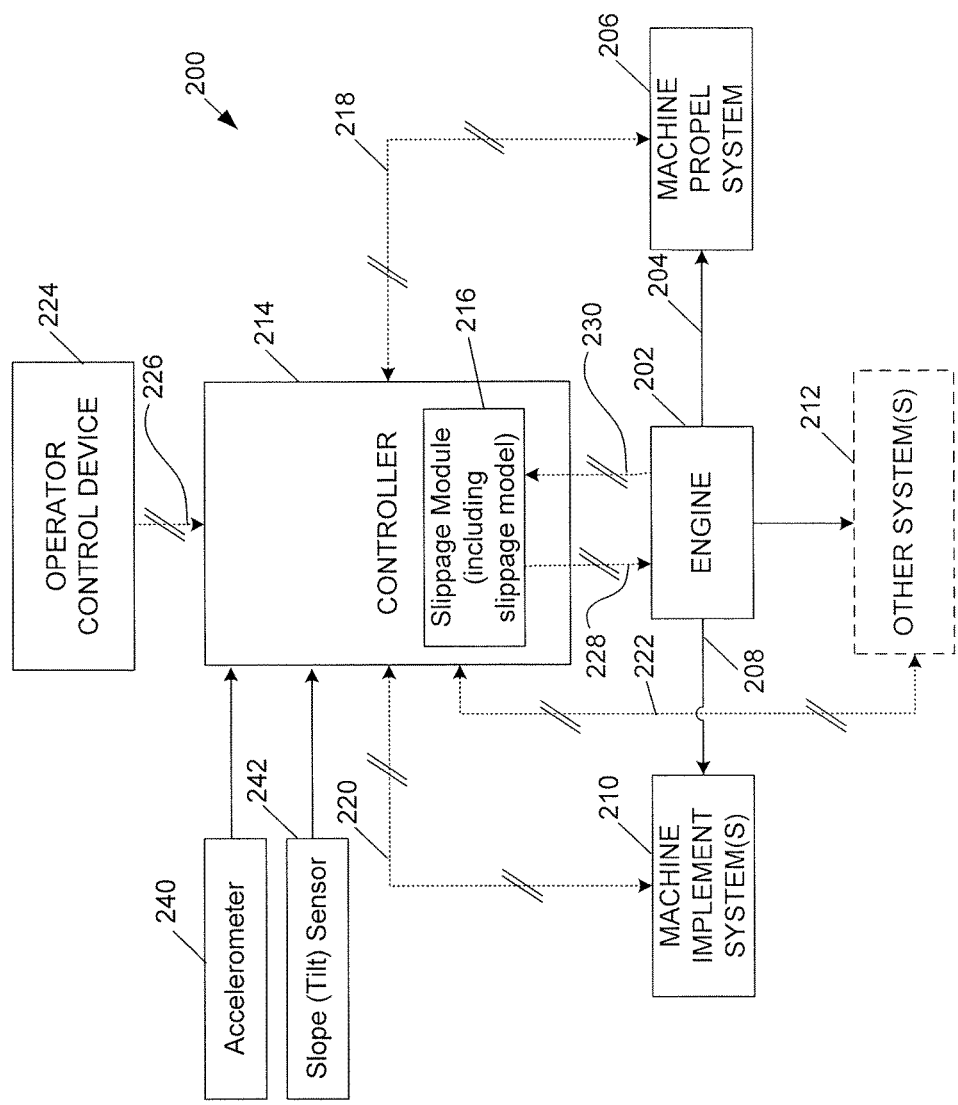
FIG. 2 is a block diagram representation of the engine, propel system (e.g., hydraulic motor, sensors and a programmed controller (including slip percentage module) of an exemplary machine in accordance with the disclosure.

A simplified block diagram of a power system 200 for a machine, for example, the machine 100 (FIG. 1), is shown in FIG. 2. The power system 200 includes a prime mover or, as illustrated, an engine 202. The engine 202 is arranged to provide power to various machine systems during operation. Such systems are used to propel or otherwise move the machine, and/or provide a machine function. In the illustrative example, the engine 202 provides power, via a propel power 204 output to one or more systems that operate to move the machine, which is/are shown collectively as a machine propel system 206.

The machine propel system 206 includes one or more types of motive force generation for the machine 100, such as hydraulic, electrical, mechanical, pneumatic, etc. The propel power 204 is provided in any suitable form including, for example, as mechanical power from a rotating shaft, electrical power, etc. The machine propel system 206 includes one or more motors (not shown) that are arranged to rotate or otherwise actuate components providing force for driving, for example, the two continuous tracks 114 of the machine 100. Alternatively, the machine propel system 206 includes one or more clutches or gear packs, for example, bevel gears, planetary gear sets, track sprockets, etc., that transmit power from the engine 202 in a direct drive configuration to propel the machine 100. In reference to FIG. 1, such motors of the machine propel system 206 may operate to rotate gears within the final drives 118, which in turn cause the two continuous tracks 114 to rotate.

In addition to the propel power 204, the engine 202 may provide an implement power 208 to one or more implements of the machine 100, which is/are collectively illustrated as machine implement system(s) 210. The machine implement system 210 includes any known type of actuator using a power input to perform a function. Such power input is converted, for example, into mechanical power that operates a machine implement. With reference to FIG. 1, for example, the implement power 208 is provided in the form of mechanical power operating a hydraulic pump (not shown) providing a flow of pressurized fluid to cause movement of the actuator 112.

The engine 202 may also provide power to operate other systems, which are collectively denoted by 212 in FIG. 2. Such other systems may include fans, blowers, air-conditioning compressors, lights, electronic systems, and/or other machine systems.

In the illustrative embodiment, the power system 200 includes a programmed controller 214. The programmed controller 214 is, for example, a single controller or alternatively includes more than one controller disposed to control various functions and/or features of the machine 100. The programmed controller 214, by way of example, includes a slippage module 216. The slippage module 216, also referred to more generally as a traction module, comprises computer-executable instructions that facilitate creating, updating and using a slippage model to limit propulsive force applied by the two continuous tracks 114 to manage slippage of the two continuous tracks 114 during operation of the machine 100.

In the illustrated embodiment, the power system 200 includes various links disposed to exchange information and command signals between the programmed controller 214 and the various systems of the machine 100. Such links are of any appropriate type, and may be capable of two-way exchange of multiple signals. In one embodiment, such links are channels of communication between various devices that are connected to one another via a controller area network (CAN). More specifically, a propel communication link 218 interconnects the programmed controller 214 with the machine propel system 206. The propel communication link 218 provides propel commands and settings to the machine propel system 206, such as an operator command to propel the machine 100, which may include an actuation signal for one or more motors. The propel communication link 218 provides information about the machine propel system 206 to the programmed controller 214. Such information includes a torque or power consumption of the machine propel system 206 in real time during operation, the speed of operation of the one or more (hydraulic) motors, and so forth. The set of signals received by the programmed controller 214 includes the following parameters for generating, updating and using the slippage model described herein: acceleration (in direction of machine motion), machine incline/slope (estimated or measured), motor speed (machine speed, proportional to motor RPM), pressure across hydraulic motor (for hydraulically powered machine), and motor(s) displacement command (delivered power).

In a similar fashion, an implement communication link 220 may be configured to interconnect the programmed controller 214 with the machine implement system 210. The implement communication link 220 provides command signals to operate the various implements associated with the machine implement system 210, as well as to provide information about the operation of the various implements, such as torque or power utilization, to the programmed controller 214. In one embodiment, various other components and systems 212 of the machine are interconnected with the programmed controller 214 via other, respective communication links, which are collectively denoted by reference numeral 222 in FIG. 2. Such other communication links are capable of two-way communication of information and other signals between the programmed controller 214 and the various other systems 212 of the machine 100.

During operation of the power system 200, the programmed controller 214 may be configured to receive and process information relating to determining torque/force or power utilization by the various systems, for example the machine propel system 206. The programmed controller 214 determines drive force exerted by individual ones of the two continuous tracks 114 from operating parameter values received by the programmed controller 214 from; for example, hydraulic motor sensors of the machine propel system 206.

An actual current velocity of the machine 100 is derived, for example, from a filtered stream/series of instantaneous acceleration signals provided by an accelerometer 240. The filtered acceleration signal specified by the accelerometer 240 may be normalized, when calculating velocity for machine travel on a non-level travel surface, using a signal provided by a slope sensor 242. The slope sensor 242 specifies the grade upon which the machine is traveling (in a forward direction). A non-slipping (theoretical maximum) velocity of the machine 100 is determined, for example, by observing a speed of propulsive drive components, such as the rotation speed of the final drives 118 for the two continuous tracks 114, and relating the rotational speed to linear displacement of the machine 100 via the two continuous tracks. Due to the noisy nature of signals used to determine the velocity values used for generating slippage model data points, the actual and non-slipping velocities are preferably obtained by processing a series of raw data values and generating a filtered velocity value through post-processing.

Processing the received information includes various operations, including generating slippage and track-to-normal force values used to update the slippage model maintained by the slippage module 216 during operation of the machine 100. The calculations performed by the programmed controller 214, under direction of the slippage module 216, ensure that the slippage model is maintained up-to-date (in the case of changing continuous track-to-ground interface conditions). Moreover, such calculations are used to determine a current slippage based upon a currently calculated track-to-normal force ratio, and reduce power output of the machine propel system 206 (in particular the motor(s) contained therein) to ensure that slippage of the two continuous tracks 114 upon the ground is below a specified limit. As can be appreciated, efficient utilization of engine power, by ensuring power is not wasted through excessive slipping by the two continuous tracks 114, can promote lower fuel consumption, reduce damage to the ground by the tracks, and reduce noise.

The programmed controller 214 is, by way of example, connected to the engine 202 by two communication links, an engine output link 228 and an engine input link 230. The engine output link 228 represents the ability of the programmed controller 214 to provide command signals to various engine actuators and systems that control the operation of the engine 202. As is known, the programmed controller 214 can control engine speed and power by, for example, controlling the amount of fuel and/or air that enters the engine 202. Such engine control is typically based on various engine operating parameters, such as engine speed. Information signals that are indicative of one or more engine operating parameters are provided to the programmed controller 214 via the engine input link 230. As discussed above, the engine input link 230 and the engine output link 228 are embodied in any appropriate arrangement, for example, by use of CAN links that are capable of transferring more than one signal at the same time, but other arrangements may be used.

It will be appreciated that the programmed controller 214 discussed herein is a computing device, e.g., a processor, which reads computer-executable instructions from a computer-readable medium and executes those instructions. Media that are readable by a computer include both non-transitory and transitory media. Examples of the former include magnetic discs, optical discs, flash memory, RAM, ROM, tapes, cards, etc. Examples of the latter include acoustic signals, electrical signals, AM and FM waves, etc. As used in the appended claims, the term "non-transitory computer-readable medium" denotes tangible media that are readable by a computer unless otherwise specifically noted in the claim.

Figure 3:
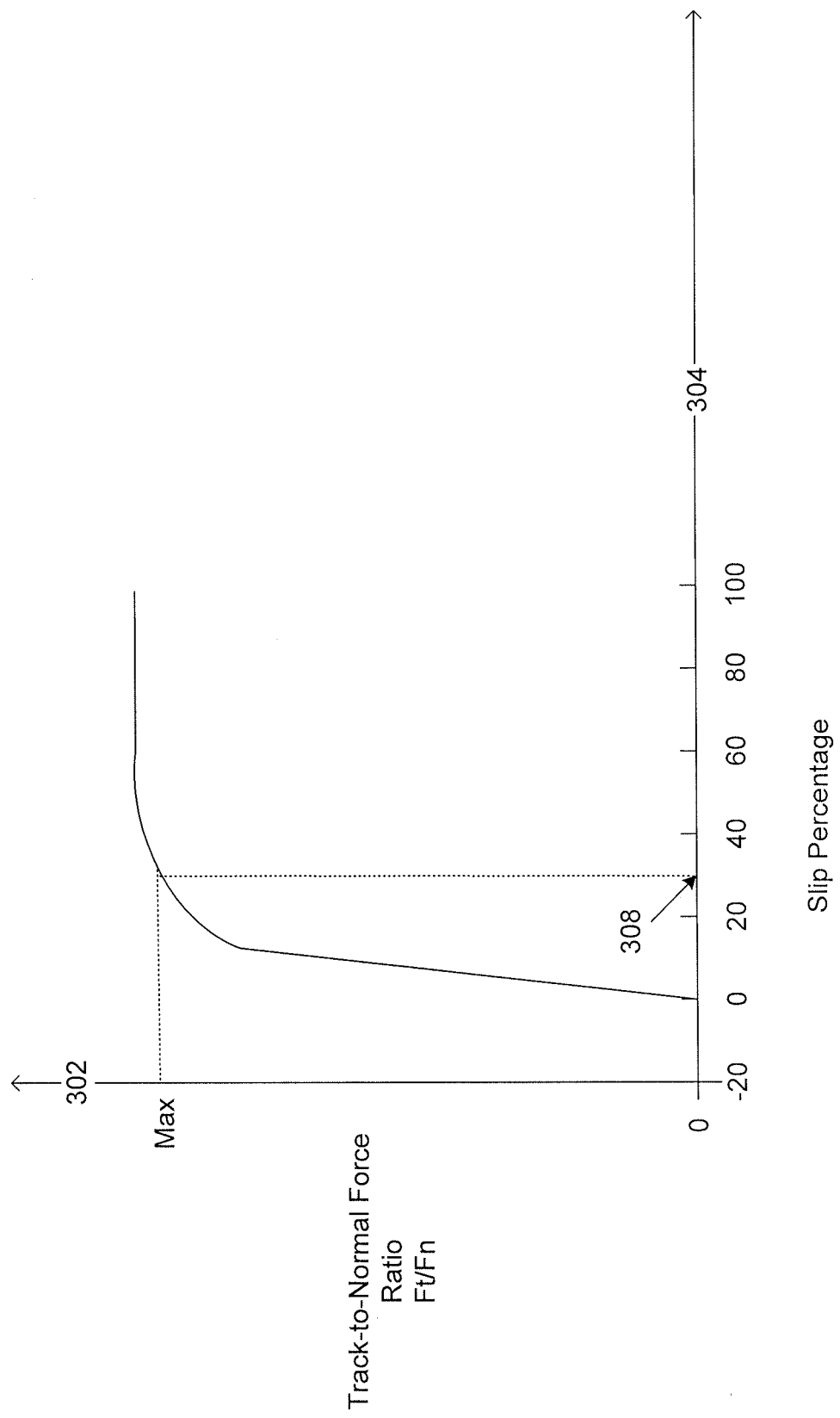
FIG. 3 is a graphic depiction of an exemplary slippage model maintained by a controller of a machine that relates slip percentage and track-to-normal force.

Having described an exemplary machine 100 and power control arrangement (FIG. 2), attention is now directed to FIG. 3 that illustratively depicts an exemplary slippage model maintained and used by the programmed controller 214 to detect excessive slippage of the drive tracks of the machine 100. In the illustrative example, the slippage model is represented by a two-dimensional graph. A vertical axis 302 specifies a ratio of a propulsive force (Ft) exerted by the two continuous tracks 114 (i.e., track force) upon the ground to a normal force (Fn) exerted by the machine 100 on the ground underneath the machine 100. The programmed controller 214 may be configured to determine track force (Ft), for example, by observing hydraulic motor operating parameters provided by the machine propel system 206. By way of example Ft is calculated according to the equation:

$$Ft = [Dm \times (\text{delta})P \times GRFD/Rs] - [\text{machine mass} \times a] \quad \text{(Equation 1)}$$

Dm is the hydraulic motor displacement;
delta P is the differential pressure across the hydraulic motor;
GRFD is the gear ratio of the final drive;
Rs is the radius of the sprockets driving the continuous track; and
"machine mass×a" is the force due to instantaneous acceleration of the machine.

In an exemplary embodiment, measurements are taken while the machine acceleration is zero thus removing the last of the two calculated components of Equation 1.

The normal force (Fn) can be determined by multiplying the weight of the machine 100 by the cosine of the incline slope angle of the machine 100.

Since the weight of the machine 100 is relatively stable, movement along the vertical axis 302 away from the original corresponds to an increase in either the drive force exerted by the machine 100 or an increase in the grade upon which the machine 100 is traveling (in the direction of travel)—which decreases the normal force.

A horizontal axis 304 in the graph depicted in FIG. 3 specifies a model-based percentage of slip that the two continuous tracks 114 experience for a designated continuous track-to-normal force ratio (identified on the vertical axis 302). By way of example, slip percentage (SP) is generated according to the equation:

$$SP = 100 \times [V\text{non-slip} - V\text{actual}]/V\text{non-slip} \quad \text{(Equation 2)}$$

Vnon-slip is the velocity of the machine when no slipping occurs at the track/ground interface, and Vactual is the true current speed of the machine as derived from sensor readings (e.g., a stream of instantaneous accelerometer signal values provided by the accelerometer 240). Thus, for no slipping, the value for the slippage is zero, and for full slipping (i.e., no actual velocity) the slippage is 100 percent.

In general, the slippage model depicted in FIG. 3 identifies a ground/track interface characterized by increasing tendency for slippage (along the horizontal axis 304) as the track-to-normal force ratio (along the vertical axis 302) increases. In operation, a slip percentage limit 308 may be designated for use by the programmed controller 214. In the example provided in FIG. 3, the maximum slip percentage is set at 30 percent. A force identified as "Max" on the vertical axis corresponds to the slip percentage limit 308. Thereafter, the programmed controller 214 may be configured to calculate a current track-to-normal force ratio during operation of the machine 100. If the current track-to normal force ratio exceeds the MAX value, then a slip percentage exceeding the slip percentage limit 308 is implied by the slippage model depicted in FIG. 3. In response to detecting the excessive force ratio (and by implication excessive slippage), the programmed controller 214 may be configured to issue control signals to the engine 202 and/or machine propel system 206 to reduce power delivered by the hydraulic motor to drive components of the machine 100 such as the continuous track. Such power reduction occurs in any of a variety of ways including: reducing motor speed by reducing the ratio of the pump-to-motor displacements (e.g., increasing the motor displacement). However, other ways to reduce hydraulic motor speed are contemplated. After reducing the hydraulic motor power output, the programmed controller executes further calculations of the track-to-normal force ratio to confirm that the previous power reduction resulted in operation of the machine 100 below the specified slip percentage limit.

Figure 4:
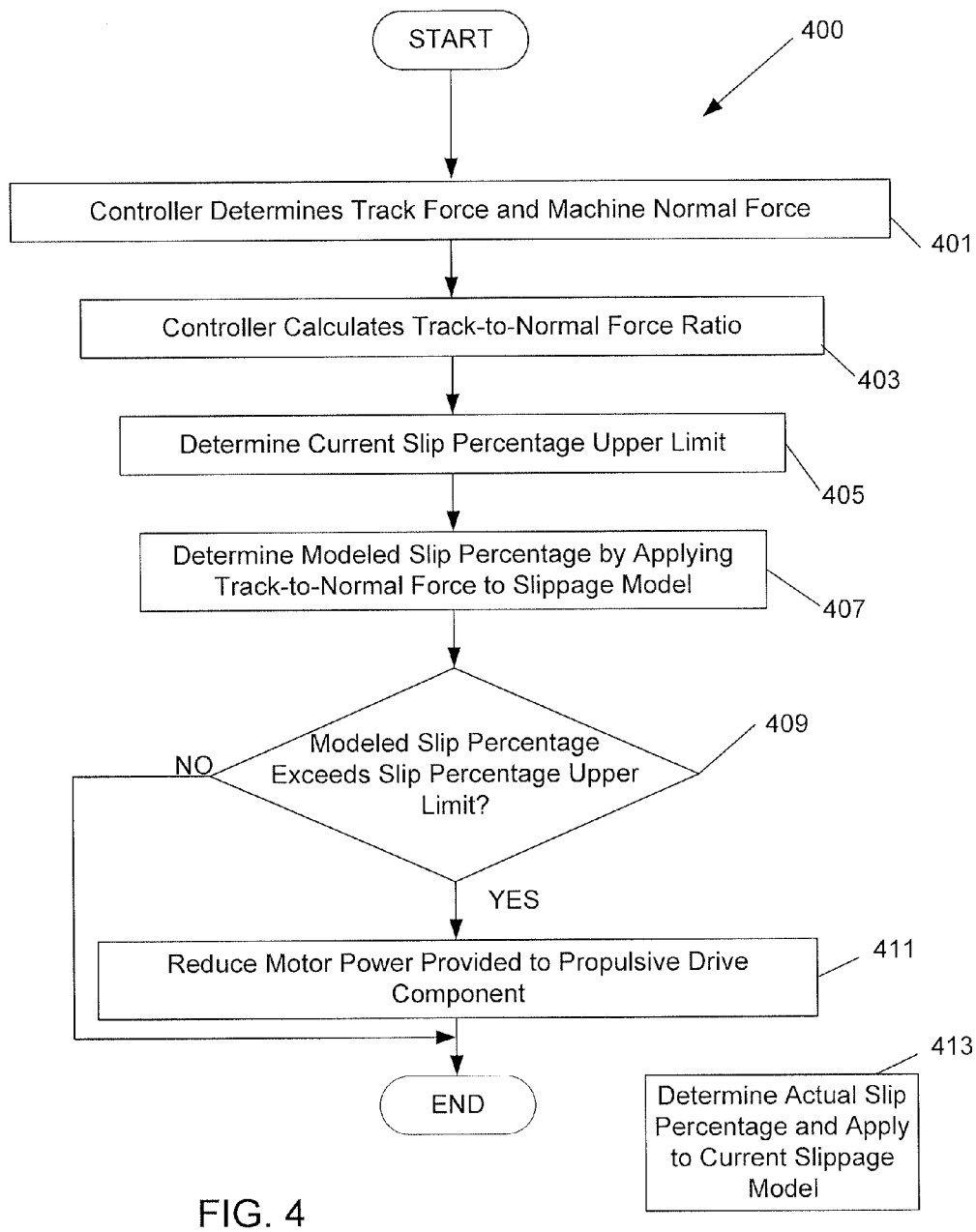
FIG. 4 is a flowchart summarizing operation of an exemplary process carried out by a controller to manage slipping during propulsion of a machine in accordance with the disclosure.

FIG. 4 summarizes a set of steps for a process 400, carried out by the machine 100 under the direction of the programmed controller 214. The summarized steps relate to use and updating the slippage model, such as the one depicted in FIG. 3, to control/limit the propulsive power delivered by a motor (e.g., hydraulic motor) to propulsive drive components, such as the two continuous tracks 114, to ensure that slip percentage (alternatively specified as fraction) is maintained under a designated limit. The process 400 is exemplary. Thus, variations are contemplated for controlling, based on various observed machine parameters, the power output by the motor to propulsive drive components to prevent excessive slippage at the machine/ground interface of the machine 100. It is noted that prior to operation of the process 400, the slippage model (see e.g., FIG. 3) may be stored in the slippage module 216. The slippage model may be built (and dynamically updated during current operation of the machine 100) by calculating slip percentage (see Equation 2 above) for a range of track-to-normal force ratios. By way of example, the slippage model is created by applying a set of actual observed points to a curve-fitting program (resulting in a characterizing curve equation representing the slippage model graphically depicted, by way of example, in FIG. 3.

During step 401, the programmed controller 214 may be configured to determine current (potentially filtered) values for: (1) a track force currently exerted by a propulsive drive component, such as one of the two continuous tracks 114; and (2) a current machine normal force based upon a known machine weight and a slope of a surface upon which the machine 100 is currently traveling. By way of example, the track force may be determined indirectly from machine and motor operational parameters (e.g., differential pressure across hydraulic motor, motor displacement, gear ratio of final drive, and wheel/sprocket radius). In particular, the track force may be determined in accordance with Equation 1 (see above) using readily available machine parameter values. A slope signal is provided, for example, by the slope sensor 242 to facilitate calculating a current normal force for the machine 100. The normal force is calculated from a gross weight of the machine 100 multiplied by the cosine of an angle of a slope upon which the machine 100 currently travels. During operation of the machine, the programmable controller 214 may be configured to apply a current track-to-normal force ratio to the slip percentage model. The normal force can be at least approximated based upon the machine weight and a current grade of a potentially sloping surface upon which the machine is traveling.

During step 403, the programmed controller 214 may be configured to calculate a track-to-normal force ratio based upon the values determined during step 401. It is noted that the described ratio may be used to adjust for instances where the slope in the machine 100's direction of travel is substantial. If neither slope nor machine weight changes substantially, then it may be sufficient to use a value representative of the propulsive track force (by a continuous track or wheel) at a physical interface between the machine 100 and the ground.

A currently designated slippage (e.g., slip percentage) upper limit is determined during step 405. The slippage limit is pre-designated and/or specified during operation of the machine 100 to adapt slip behavior of the machine 100 in response to current conditions and operator preferences.

Thereafter, during step 407 the track-to-normal force ratio may be applied by the programmed controller 214 to the slippage model maintained by the slippage module 216 to determine a modeled slip percentage.

Next, during step 409, if the modeled slip percentage determined during step 407 based upon the slippage model and the current track-to-normal force ratio exceeds the currently designated slip percentage limit, then control passes to step 411. At step 411 the programmed controller 214 may be configured to issue a signal to the engine 202 and/or the machine propel system 206 (e.g., a hydraulic motor of the machine propel system 206) to reduce output power provided by the motor to the propulsive drive components. By way of example, the programmed controller 214 issues a signal to the machine propel system 206 to reduce the output power of a hydraulic motor by increasing a hydraulic motor displacement in relation to a hydraulic pump displacement (i.e., reduce a transmission ration of a hydraulic CVT). The power reduction ensures that the machine at least operates more efficiently (consuming less power) while the modeled slip percentage (as opposed to actual slip percentage) exceeds the upper limit determined during step 405. Control then passes to the End.

If, at step 409, the programmed controller 214 determines that the slip percentage upper limit has not been exceeded by the modeled slippage (in view of the current track-to-normal force calculation), then control passes from step 409 to the End.

The process summarized in FIG. 4 can be repeatedly performed during operation of the machine 100 to actively manage slippage in the machine 100. Thus, after a configured wait period (e.g., a time-period driven event is generated in the programmed controller 214) the process summarized in FIG. 4 repeats.

It is noted that generating the various parameters used to determine whether excessive slippage is occurring during step 409 can occur at any time, and the programmed controller 214 uses the currently available values for the relevant parameters used to determine whether excessive slipping is occurring during step 409. Thus, the order of the steps shown in FIG. 4 can be re-arranged (and some steps may even be skipped) without notable effect upon the operation of the system as long as step 409 is executed relatively frequently.

Similarly, it is noted that calculating a new value for actual slip percentage may be relatively slow (over an order of magnitude slower) in comparison to the repetition period for executing step 409. For this reason, step 413 (used to dynamically update the slippage model during operation of the machine 100) may be placed outside the sequence of steps depicted in FIG. 4. During step 413, the programmed controller 214 may calculate an actual slippage for the current operating state of the machine 100 based upon calculated actual and non-slipping velocities of the machine in accordance with Equation 2 (above). The calculated actual slippage (at the calculated track-to-normal force ratio) is thereafter applied to the current slippage model maintained by the slippage module 216. Application of the actual slippage to the slippage model may involve applying a weight to the new calculation and then combining the new calculation with the current value for slippage at the specified track-to-normal force ratio in the slippage model (sample filtering). Such filtering provides a level of stability in the short term, and enables medium and long-term-adaptation of the slippage model for changing conditions (e.g., surface conditions).

The illustrative control process described herein above with reference to FIG. 4 can be modified and/or enhanced through use of additional and/or alternative sensors. For example, rather than having a single slippage model for the machine 100's operation, the mapping depicted in FIG. 3 is established multiple times. Each slippage model generated by the programmed controller 214 is identified by a descriptive term representative of surface traveled by the machine 100 while a particular one of the multiple slippage models is generated. Such configuration is performed potentially multiple times to account for various ground/surface conditions influencing the slippage model summarized, for example, in FIG. 3. The set of stored slippage models, for various operating conditions is extensible. Thus, an operator of the machine 100 can designate a new model (e.g., characteristic equation) to be generated from sufficient data points for a curve fitting program to operate.

INDUSTRIAL APPLICABILITY

The present disclosure is applicable to driven machines having a propulsive force applied to ground during travel such as, for example, continuous track drive machines. In particular, the disclosed principles provide a mechanism for preventing excessive slippage in such machines. This system may be implemented in a variety of machines that operate under a variety of propulsive load conditions and are likely to experience slipping of propulsive elements (e.g., continuous tracks) during normal operation. Although many machines that may benefit from the disclosed principles will be machines used in off-road machines having continuous track drives, it will be appreciated that the disclosed machines and programmed controller process for such machines are used in other contexts as well, and the teachings are likewise broadly applicable.

Using the disclosed principles, the programmed controller 214 prevents excessive slippage by reducing force delivered by propulsive components of the machine (e.g., a hydraulic motor). It will be appreciated that this description provides examples of the disclosed system and technique. However, it is contemplated that other implementations of the disclosure may differ in detail from the foregoing examples. Moreover, the references to examples herein are intended to reference the particular example being discussed at that point and are not intended to imply any limitation as to the scope of the disclosure more generally. All language of distinction and disparagement with respect to various features is intended to indicate a lack of preference for those features, but not to exclude such from the scope of the disclosure entirely unless otherwise indicated. Although the engine 202 is typically an internal combustion engine, other engines/motors are contemplated for use in the machine 100 without departing from the scope of the disclosed principles.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order and from any suitable step unless otherwise indicated herein or otherwise clearly contradicted by context.

What is claimed is:

1. A programmed controller-implemented method of managing excessive slippage at a physical interface between a machine and a traveled surface, the method comprising:
   determining a track force, the track force being indicative of a propulsive force exerted by the machine on the traveled surface;
   determining a modeled slippage based, at least in part, upon the track force and a slippage model; and
   conditionally causing, by a programmed controller, a reduction of power output to propulsive drive components, by a motor, based upon a comparison, by the programmed controller, between the modeled slippage and a slippage limit.

2. The method of claim 1, further comprising:
   receiving a signal indicative of a normal force upon the traveled surface; and
   calculating a ratio of the track force and the normal force, wherein the modeled slippage is determined by applying the ratio to the slippage model.

3. The method of claim 2, wherein the slippage model relates the ratio to the modeled slippage, and
   wherein a slippage value for the modeled slippage is defined, at least in part by, a ratio between:
   (1) a slip velocity, consisting of a difference between a non-slip velocity and an actual velocity of the machine; and
   (2) the non-slip velocity of the machine.

4. The method of claim 3 wherein the slippage is defined as a slip percentage.

5. The method of claim 1 wherein the motor is a hydraulic motor, and the conditionally causing a reduction of power output to drive components comprises reducing a speed of the hydraulic motor.

6. The method of claim 2 wherein the normal force upon the traveled surface is determined according to the expression: (machine weight)×cosine(traveled slope).

7. The method claim 1 wherein the motor is a hydraulic motor, and wherein the track force is determined according to the expression:

$$Ft=[Dm \times (delta)P \times GRFD/Rs]-[\text{machine mass} \times a]$$

where:
Dm is the hydraulic motor displacement;
delta P is the differential pressure across the hydraulic motor;
GRFD is the gear ratio of the final drive;
Rs is the radius of the sprockets driving the continuous track; and
"machine mass×a" is the force due to instantaneous acceleration of the machine.

8. The method of claim 1 further comprising:
   determining an actual velocity of the machine in a forward direction;
   determining a non-slip velocity of the machine based upon a speed of a propulsive drive component of the machine;
   calculating a current slippage, wherein the current slippage is defined, at least in part, by a current slip ratio between:
   (1) a difference between the non-slip velocity and the actual velocity of the machine; and
   (2) the non-slip velocity of the machine; and
   updating the slippage model based, at least in part, upon the current slippage and the track force.

9. The method of claim 8 further comprising the step of:
   processing a stream of accelerometer signal values to render the actual velocity of the machine.

10. The method of claim 9 wherein the processing step comprises applying a filter to the stream of accelerometer signal values.

11. The method of claim 8 wherein updating the slippage model comprises applying a filter to the current slippage when incorporating the current slippage into the slippage model.

12. A non-transitory computer-readable medium including computer executable instructions for managing excessive slippage at a physical interface between a machine and a traveled surface, the computer-executable instructions, when executed by a programmed controller, facilitating performing the steps of:
   determining a track force, the track force being indicative of the propulsive force exerted by the machine on the traveled surface;
   determining a modeled slippage based, at least in part, upon the track force and a slippage model; and conditionally causing a reduction of power output to propulsive drive components, by a motor, based upon a comparison between the modeled slippage and a slippage limit.

13. The non-transitory computer-readable medium of claim 12, further comprising computer-executable instructions for:
receiving a signal indicative of a normal force upon the traveled surface; and
calculating a ratio of the track force and the normal force, wherein the modeled slippage is determined by applying the ratio to the slippage model.

14. The non-transitory computer-readable medium of claim 13, wherein the slippage model relates the ratio to the modeled slippage, and
wherein a slippage value for the modeled slippage is defined, at least in part by, a ratio between:
(1) a slip velocity, consisting of a difference between a non-slip velocity and an actual velocity of the machine; and
(2) the non-slip velocity of the machine.

15. The non-transitory computer-readable medium of claim 12 wherein the motor is a hydraulic motor, and wherein the track force is determined according to the expression:

$$Ft = [Dm \times (delta)P \times GRFD/Rs] - [\text{machine mass} \times a]$$

where:
Dm is the hydraulic motor displacement;
delta P is the differential pressure across the hydraulic motor;
GRFD is the gear ratio of the final drive;
Rs is the radius of the sprockets driving the continuous track; and
"machine mass×a" is the force due to instantaneous acceleration of the machine.

16. The non-transitory computer-readable medium of claim 12 further comprising computer-executable instructions for:
determining an actual velocity of the machine in a forward direction;
determining a non-slip velocity of the machine based upon a speed of a propulsive drive component of the machine;
calculating a current slippage, wherein the current slippage is defined, at least in part, by a current slip ratio between:
(1) a difference between the non-slip velocity and the actual velocity of the machine; and
(2) the non-slip velocity of the machine; and
updating the slippage model based, at least in part, upon the current slippage and the track force.

17. A machine including:
a propulsive force source for driving the machine on a traveled surface; and
a programmed controller including a slippage control module including computer-executable instructions for managing excessive slippage at a physical interface between a machine and a traveled surface, the computer-executable instructions, when executed by the programmed controller, facilitating performing the steps of:
determining a track force, the track force being indicative of the propulsive force exerted by the machine on the traveled surface;
determining a modeled slippage based, at least in part, upon the track force and a slippage model; and
conditionally causing a reduction of power output to propulsive drive components, by a motor, based upon a comparison, by the programmed controller, between the modeled slippage and a slippage limit.

18. The machine according to claim 17 wherein the propulsive force source is a hydraulic motor.

19. The machine according to claim 18 further comprising a continuous track driven by the hydraulic motor.

20. The machine according to claim 17 wherein the slippage control module further comprises computer-executable instructions for:
determining an actual velocity of the machine in a forward direction;
determining a non-slip velocity of the machine based upon a speed of a propulsive drive component of the machine;
calculating a current slippage, wherein the current slippage is defined, at least in part, by a current slip ratio between:
(1) a difference between the non-slip velocity and the actual velocity of the machine; and
(2) the non-slip velocity of the machine; and
updating the slippage model based, at least in part, upon the current slippage and the track force.

* * * * *